(12) United States Patent
Wang

(10) Patent No.: US 7,082,043 B2
(45) Date of Patent: Jul. 25, 2006

(54) DRIVE CIRCUIT FOR A SYNCHRONOUS RECTIFIER, METHOD OF PROVIDING DRIVE SIGNALS THERETO AND POWER CONVERTER INCORPORATING THE SAME

(75) Inventor: Thomas G. Wang, Plano, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 213 days.

(21) Appl. No.: 10/801,778

(22) Filed: Mar. 16, 2004

(65) Prior Publication Data
US 2005/0207182 A1     Sep. 22, 2005

(51) Int. Cl.
*H02M 7/217*     (2006.01)
(52) U.S. Cl. .......................................... 363/127; 363/17
(58) Field of Classification Search .................. 363/17, 363/21.06, 21.14, 89, 127
See application file for complete search history.

(56) References Cited
U.S. PATENT DOCUMENTS

| | | | |
|---|---|---|---|
| 3,940,682 A * | 2/1976 | Park et al. .................. 363/127 |
| 4,716,514 A * | 12/1987 | Patel .......................... 363/127 |
| 5,774,350 A * | 6/1998 | Notaro et al. ................. 363/89 |
| 5,870,299 A * | 2/1999 | Rozman ...................... 363/127 |
| 6,169,675 B1 * | 1/2001 | Shimamori et al. ........... 363/70 |
| 6,370,044 B1 * | 4/2002 | Zhang et al. ............. 363/21.06 |
| 6,563,719 B1 * | 5/2003 | Hua et al. ................ 363/21.06 |
| 6,583,993 B1 * | 6/2003 | Hua ......................... 363/21.06 |
| 6,597,587 B1 * | 7/2003 | Poon et al. .............. 363/21.06 |
| 6,628,532 B1 * | 9/2003 | Rinne et al. ............. 363/21.06 |
| 6,839,248 B1 * | 1/2005 | Yang ....................... 363/21.12 |
| 6,859,373 B1 * | 2/2005 | Jin et al. ................. 363/21.06 |

\* cited by examiner

*Primary Examiner*—Jeffrey Sterrett

(57) ABSTRACT

The present invention provides a transition-isolating drive circuit for a synchronous rectifier. In one embodiment, the transition-isolating drive circuit includes drive switches coupled to a transformer winding and configured to provide drive signals for the synchronous rectifier. Additionally, the transition-isolating drive circuit also includes a conduction-inhibiting circuit, coupled to the drive switches, that increases a turn-off voltage of the drive signals to a predetermined level.

21 Claims, 4 Drawing Sheets

DRIVE CIRCUIT FOR A SYNCHRONOUS RECTIFIER, METHOD OF PROVIDING DRIVE SIGNALS THERETO AND POWER CONVERTER INCORPORATING THE SAME

TECHNICAL FIELD OF THE INVENTION

The present invention is directed, in general, to power converters and, more specifically, to a transition-isolating drive circuit, a method of providing drive signals to a synchronous rectifier and a power converter incorporating the same.

BACKGROUND OF THE INVENTION

In general, the demand for smaller electronic circuit modules having more features or capabilities than their predecessors has been increasing. This is especially true in the case of power converters. A power converter is a power processing circuit that converts an input voltage waveform into a specified output voltage waveform. In many applications requiring a DC output, switched-mode DC/DC power converters are frequently employed to advantage wherein both high conversion density and converter efficiency are key design requirements.

These switched-mode DC/DC power converters generally include an inverter, an isolation transformer and a rectifier on a secondary side of the isolation transformer. The inverter typically includes a main power switch employing MOSFETs to convert a DC input voltage to an AC voltage. Then, the isolation transformer transforms this input AC voltage to an output AC voltage, and the rectifier generates the desired DC voltage at the output of the power converter. The main power switch and rectifier switches are usually operated at relatively high switching frequencies (200–300 kHz). This allows the use of smaller components such as inductors and capacitors within the power converter.

Conventionally, the rectifier may include a plurality of rectifier switches (e.g., MOSFETs acting as synchronous rectifier switches) that alternately conduct the converter output load current in response to a rectifier drive signal or circuit. A problematic operating condition arises when the rectifier drive circuit does not provide a "CLOSED" or "ON" condition of the synchronous rectifier switches that allows for balanced conduction and switching losses. A particularly troubling condition exists when the rectifier drive circuit does not adequately compensate for the Miller effect or noise couplings associated with the synchronous rectifier switches, thereby assuring that they are not conducting when directed to be "OPEN" or "OFF". This could lead to a simultaneous conduction where the synchronous rectifier switches produce a momentary short circuit across the power converter. This condition reduces converter efficiency through power loss and causes increased component stress even to the point of component failure.

Accordingly, what is needed in the art is a synchronous rectifier drive circuit that addresses these limitations.

SUMMARY OF THE INVENTION

To address the above-discussed deficiencies of the prior art, the present invention provides a transition-isolating drive circuit for a synchronous rectifier. In one embodiment, the transition-isolating drive circuit includes drive switches coupled to a transformer winding and configured to provide drive signals for the synchronous rectifier. Additionally, the transition-isolating drive circuit also includes a conduction-inhibiting circuit, coupled to the drive switches, that increases a turn-off voltage of the drive signals to a predetermined level.

In another aspect, the present invention provides a method of providing drive signals to a synchronous rectifier. The method includes employing an input voltage from a transformer winding to provide drive signals, and increasing a turn-off voltage of the drive signals to a predetermined level.

The present invention also provides, in yet another aspect, a power converter, including a main power switch coupled to a DC voltage source, a transformer coupled to the main power switch and a synchronous rectifier coupled to the transformer that provides a converter output. The power converter also includes a transition-isolating drive circuit for the synchronous rectifier, having drive switches coupled to a winding of the transformer and configured to provide drive signals for the synchronous rectifier. The power converter also includes a conduction-inhibiting circuit, coupled to the drive switches, that increases a turn-off voltage of the drive signals to a predetermined level.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
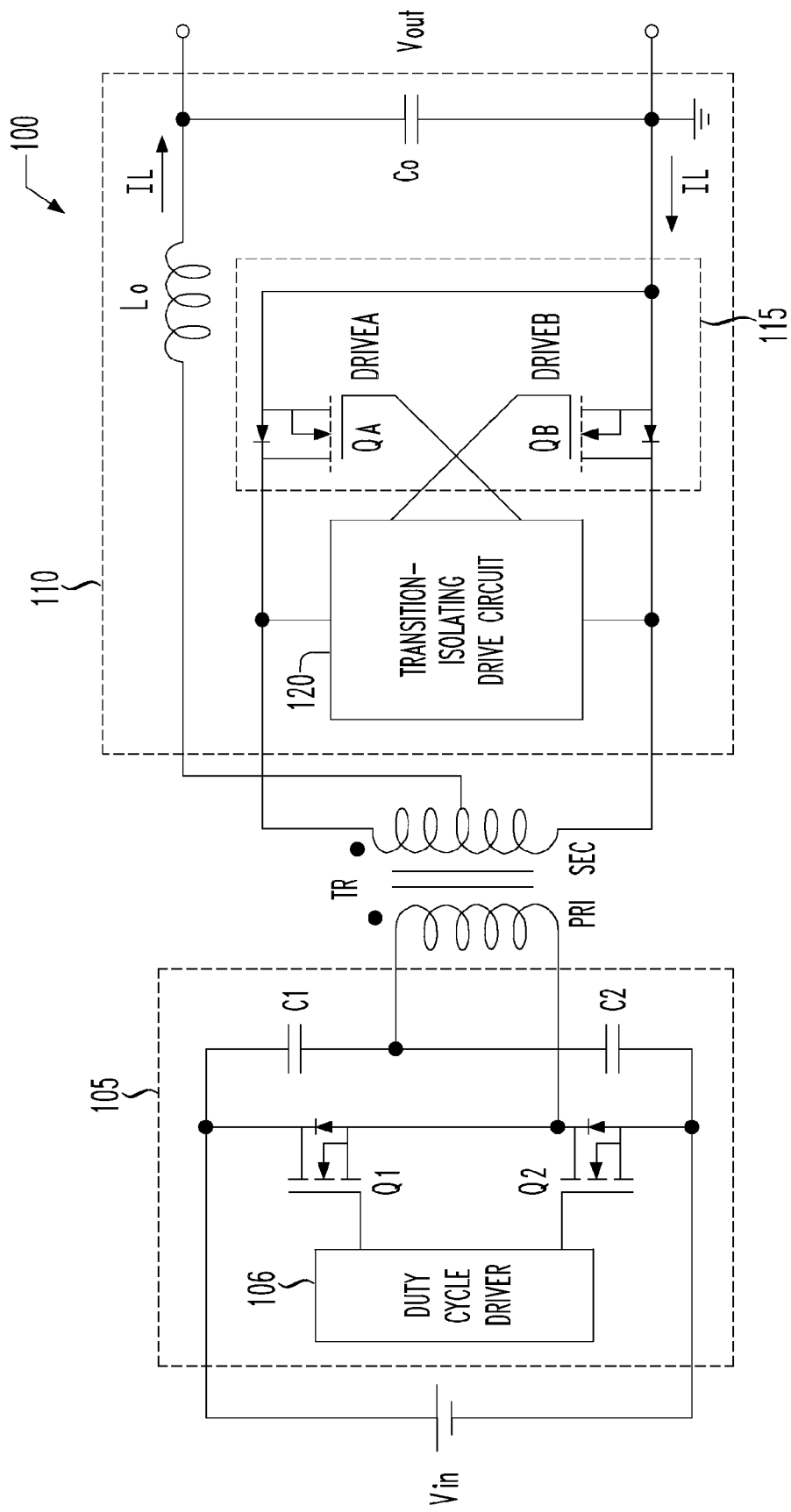
FIG. 1 illustrates a circuit diagram of an embodiment of a power converter constructed in accordance with the principles of the present invention.

Referring initially to FIG. 1, illustrated is a circuit diagram of an embodiment of a power converter, generally designated 100, constructed in accordance with the principles of the present invention. The power converter 100 includes a primary stage 105, a transformer TR having primary and secondary transformer windings PRI, SEC and a secondary stage 110. In the illustrated embodiment, the power converter 100 is exemplary of a bridge topology power converter. Alternative embodiments may employ other self-driven synchronous rectifying topologies such as forward or flyback.

The primary stage 105 is coupled to a DC voltage source Vin and includes first and second main power switches Q1, Q2 that are coupled to the primary transformer winding PRI and driven by a complementary duty cycle driver 106. The primary stage 105 also includes first and second primary capacitors C1, C2 that are coupled to the first and second main power switches Q1, Q2 and the primary transformer winding PRI. The secondary stage 110, which provides a converter output voltage Vout, is coupled to the secondary transformer winding SEC and includes a synchronous rectifier 115 having first and second synchronous switches $Q_A$, $Q_B$, an output inductor Lo and an output capacitor Co. The secondary stage 110 also includes a transition-isolating drive circuit 120 coupled to the first and second synchronous switches $Q_A$, $Q_B$.

The complementary duty cycle driver 106 employs a duty cycle of about 50% to drive the first and second main power switches Q1, Q2 alternatively into conduction. This action, in conjunction with that of the first and second primary capacitors C1, C2, places a square-wave voltage across the primary transformer winding PRI, inducing a similar voltage across the secondary transformer winding SEC. The first and second synchronous switches $Q_A$, $Q_B$ alternately conduct to provide a load current $I_L$ at the converter output voltage Vout. If the first synchronous switch $Q_A$ is conducting, the load current $I_L$ flows from the center-tap of the secondary transformer winding SEC and returns through its top half-winding. Similarly, when the second synchronous switch $Q_B$ is conducting, the load current $I_L$ flows from the center-tap of the secondary transformer winding SEC and returns through its bottom half-winding.

The transition-isolating drive circuit 120 includes drive switches that are coupled to the secondary transformer winding SEC and configured to provide first and second drive signals DRIVEA, DRIVEB for the synchronous rectifier 115. The transition-isolating drive circuit 115 also includes a conduction-inhibiting circuit, coupled to the drive switches, that increases a turn-off voltage of the first and second drive signals DRIVEA, DRIVEB to a predetermined level. Proper selection of this predetermined level provides a transition isolation zone that prevents or substantially reduces simultaneous conduction of the first and second synchronous switches $Q_A$, $Q_B$ during a transition period when one is turning off and the other is turning on.

Figure 2:
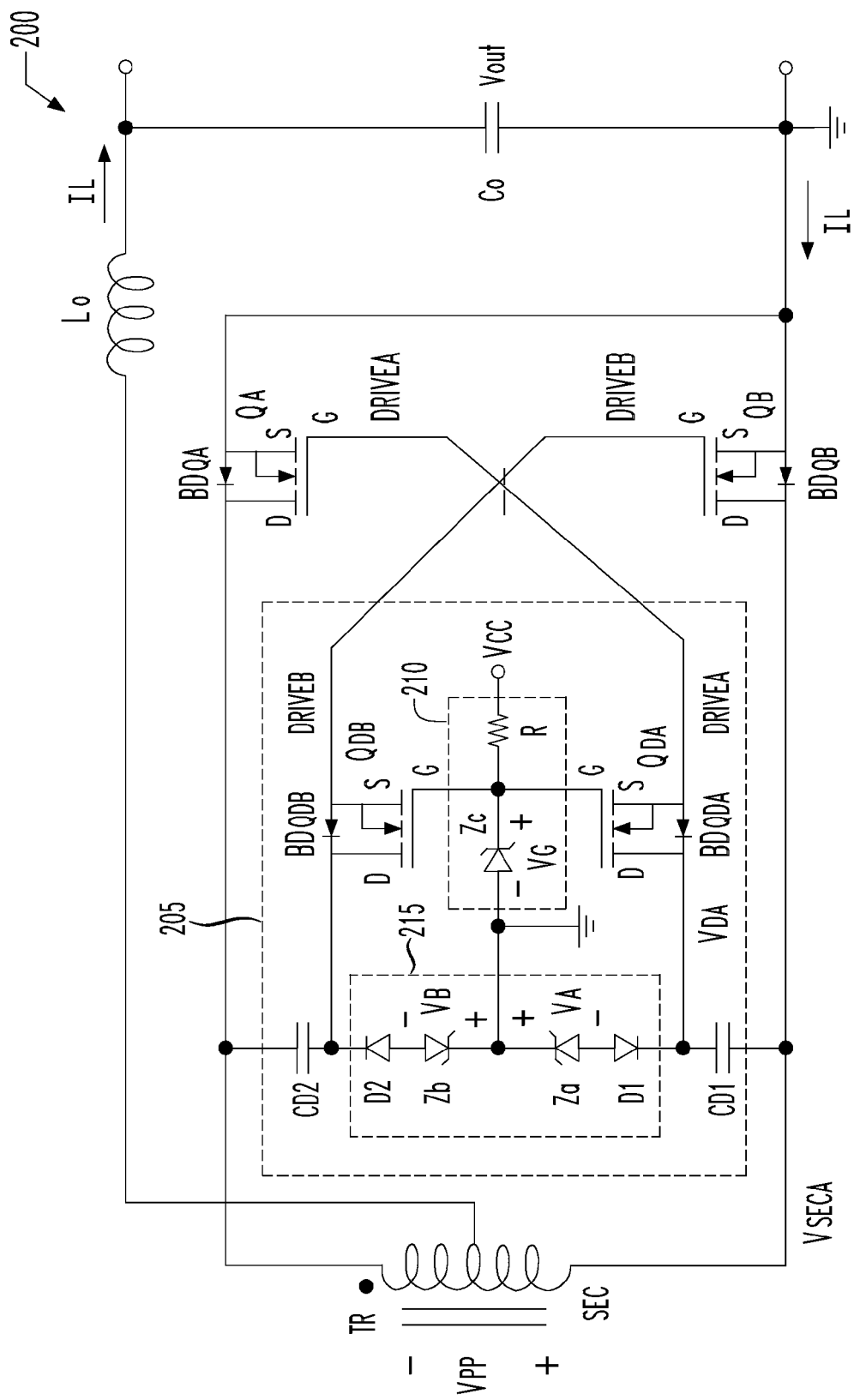
FIG. 2 illustrates a circuit diagram of a secondary stage containing an embodiment of a transition-isolating drive circuit constructed in accordance with the principles of the present invention.

Turning now to FIG. 2, illustrated is a circuit diagram of a secondary stage, generally designated 200, containing an embodiment of a transition-isolating drive circuit constructed in accordance with the principles of the present invention. The secondary stage 200 may be employed as the secondary stage 110, as was discussed with respect to FIG. 1, or as a secondary stage in another embodiment of an appropriate power converter. The secondary stage 200, which provides a converter output voltage Vout and is coupled to a secondary transformer winding SEC, includes first and second synchronous switches $Q_A$, $Q_B$, an output inductor Lo and an output capacitor Co, as before. The secondary stage 200 also includes a transition-isolating drive circuit 205 coupled to the first and second synchronous switches $Q_A$, $Q_B$ and the secondary transformer winding SEC. General operation of the secondary stage 200 parallels that of the secondary stage 110 as was discussed with respect to FIG. 1.

The transition-isolating drive circuit 205 includes first and second drive switches $Q_{DA}$, $Q_{DB}$, which are coupled to the secondary transformer winding SEC employing first and second isolation capacitors $C_{D1}$, $C_{D2}$ and to the first and second synchronous switches $Q_A$, $Q_B$, respectively. The transition-isolating drive circuit 205 also includes a conduction-enhancing circuit 210 having a resistor R coupled to a bias voltage Vcc and a conduction-enhancing zener diode Zc, which provides a conduction-enhancing voltage $V_G$ of the polarity shown. The transition-isolating drive circuit 205 further includes a conduction-inhibiting circuit 215 having first and second blocking diodes D1, D2 series coupled to first and second conduction-inhibiting zener diodes $Z_a$, $Z_b$, which respectively provide first and second conduction-inhibiting voltages $V_A$, $V_B$ of the polarities shown.

The first synchronous switch $Q_A$ is conducting (i.e., closed) when the secondary transformer winding SEC provides a secondary voltage $V_{PP}$ having a polarity shown. At this time, the first drive switch $Q_{DA}$ is also conducting and provides a first drive signal DRIVEA to the gate of the first synchronous switch $Q_A$ that is positive thereby assuring it is in a conducting state. This positive gate signal is the conduction-enhancing voltage $V_G$, provided by the conduction-enhancing circuit 210, that limits a turn-on voltage of the first drive signal DRIVEA to a predetermined level. Alternatively, the second synchronous switch $Q_B$ and the second drive switch $Q_{DB}$ are non-conducting (i.e., open) during this time. The second drive switch $Q_{DB}$ provides a second drive signal DRIVEB to the gate of the second synchronous switch $Q_B$ that is negative thereby assuring it is in a non-conducting state. This negative gate signal is the second conduction-inhibiting voltage $V_B$, provided by the conduction-inhibiting circuit 215, that increases a turn-off voltage of the second drive signal DRIVEB to a predetermined level. The predetermined level provided by the conduction-enhancing circuit 210 may be a different level than the predetermined level provided by the conduction-inhibiting circuit 215. For example, the conduction-enhancing circuit 210 may provide a 10 volt level, and the conduction-inhibiting circuit 215 may provide a two or three volt level.

Analogously, the second synchronous switch $Q_B$ is conducting when the secondary transformer winding SEC provides a secondary voltage $V_{PP}$ having a polarity opposite to that shown. At this time, the second drive switch $Q_{DB}$ is also conducting and provides a second drive signal DRIVEB to the gate of the second synchronous switch $Q_B$ that is positive, thereby assuring it is in a conducting state. This positive gate signal is again the conduction-enhancing voltage $V_G$ provided by the conduction-enhancing circuit 210. Alternatively, the first synchronous switch $Q_A$ and the first drive switch $Q_{DA}$ are non-conducting during this time. The first drive switch $Q_{DA}$ provides a first drive signal DRIVEA to the gate of the first synchronous switch $Q_A$ that is negative thereby assuring it is in a non-conducting state. This negative gate signal is the first conduction-inhibiting voltage $V_A$ provided by the conduction-inhibiting circuit 215. In the illustrated embodiment, the first and second conduction-inhibiting voltages $V_A$, $V_B$ are substantially equal. Of course, they may differ if required by another embodiment.

Figure 3:
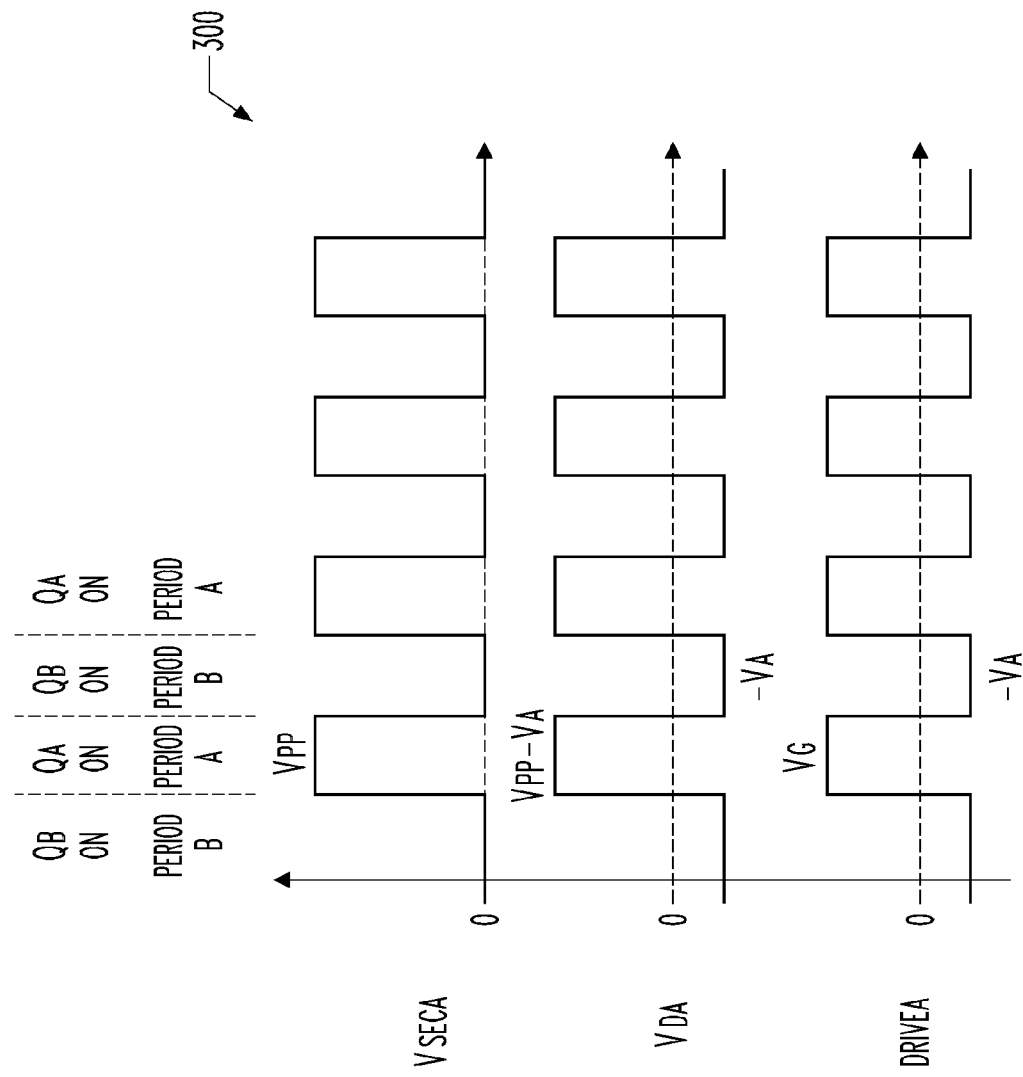
FIG. 3 illustrates switching waveforms showing selected voltages associated with the transition-isolating drive circuit of FIG. 2.

Turning now to FIG. 3 and with continued reference to FIG. 2, illustrated are switching waveforms, generally designated 300, showing selected voltages associated with the transition-isolating drive circuit 205 of FIG. 2. The switching waveforms 300 include a waveform of a transformer output voltage $V_{SECA}$, a waveform of a first drive switch drain voltage $V_{DA}$ and a waveform of the first drive signal DRIVEA.

The first synchronous switch $Q_A$ and the first drive switch $Q_{DA}$ are conducting during a time period A when the transformer output voltage $V_{SECA}$ is positive and equal to the secondary voltage $V_{PP}$. The first drive switch drain voltage $V_{DA}$ is equal to a difference between the secondary voltage $V_{PP}$ and the first conduction-inhibiting voltage $V_A$. This difference produces an offset and is due to the first isolation capacitor $C_{D1}$ maintaining a voltage level equal to the first conduction inhibiting voltage $V_A$. This first conduction-inhibiting voltage $V_A$ was provided across the first conduction-inhibiting zener diode Za during a previous time period B, when the first blocking diode D1 was conducting and not blocking as it does in the time period A. The gate of the first drive switch $Q_{DA}$ is maintained at the conduction-enhancing voltage $V_G$ thereby providing a first drive signal DRIVEA substantially equal to the conduction-enhancing voltage $V_G$.

During the time period B, the first synchronous switch $Q_A$ and the first drive switch $Q_{DA}$ are turned off and the second synchronous switch $Q_B$ and the second drive switch $Q_{DB}$ are turned on. The first drive switch drain voltage $V_{DA}$ is equal to a negative value of the first conduction-inhibiting voltage $V_A$ due to the offset voltage maintained by the first isolation capacitor $C_{D1}$. The first drive signal DRIVEA then provides this negative value of the first conduction-inhibiting voltage $V_A$ via conduction through a first drive switch body diode $BD_{QDA}$ to the gate of the first synchronous switch $Q_A$. This allows the first drive signal DRIVEA, in conjunction with the second drive signal DRIVEB, to provide a transition isolation zone for the first and second synchronous switches $Q_A$, $Q_B$ that substantially prevents them from simultaneously conducting during a synchronous switch transition.

Figure 4:
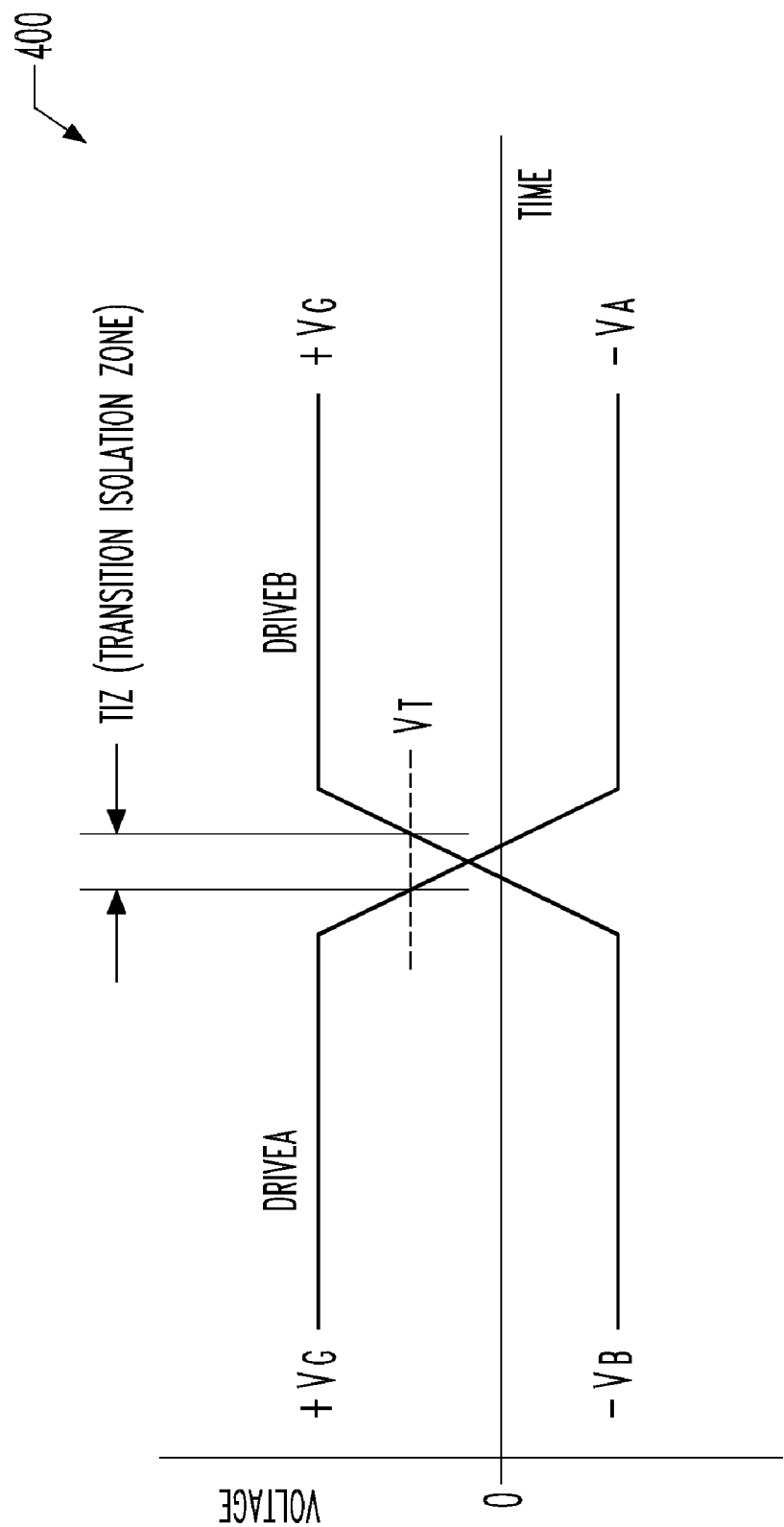
FIG. 4 illustrates drive waveforms showing an exemplary transition isolation zone associated with a transition-isolating drive circuit.

Turning now to FIG. 4, illustrated are drive waveforms, generally designated 400, showing an exemplary transition isolation zone associated with a transition-isolating drive circuit. The drive waveforms 400 include first and second drive signals DRIVEA, DRIVEB. Also shown are a threshold voltage $V_T$, first and second conduction-inhibiting voltages $V_A$, $V_B$ that are substantially equal, a conduction-enhancing voltage level $V_G$ and a transition isolation zone TIZ.

The drive waveforms 400 show the first drive signal DRIVEA turning off a first synchronous switch $Q_A$, and the second drive signal DRIVEB turning on a second synchronous switch $Q_B$. The respective drive signals turn off and turn on their respective synchronous switches at about the threshold voltage $V_T$. In the illustrated embodiment, the first and second drive signals DRIVEA, DRIVEB intersect at a level below the threshold voltage $V_T$, thereby assuring that turn-off of the first synchronous switch $Q_A$ occurs before turn-on of the second synchronous switch $Q_B$. This action provides the transition isolation zone TIZ, which acts as a guard interval to prevent simultaneous conduction of the first and second synchronous switches $Q_A$, $Q_B$. The width of the transition isolation zone TIZ may be set by appropriately adjusting values of the first and second conduction-inhibiting voltages $V_A$, $V_B$ and the conduction-enhancing voltage $V_G$ with respect to the threshold voltage $V_T$.

In summary, embodiments of the present invention employing a transition-isolating drive circuit, a method of providing drive signals to a synchronous rectifier and a power converter employing the drive circuit and method have been presented. Advantages include providing an adjustable conduction-inhibiting drive voltage level that overcomes switch Miller effect and spurious noise coupling to assure that each synchronous switch remains turned off. Additionally, an adjustable conduction-enhancing drive voltage level is provided to ensure that the synchronous switches are turned on in an efficient manner thereby balancing conduction loss and switching loss. Furthermore, a transition isolation zone is established that ensures that no short circuit condition associated with simultaneous conduction occurs during a transition time of switching between one synchronous switch and the other thereby preventing power loss and increased device stress.

Although the present invention has been described in detail, those skilled in the art should understand that they can make various changes, substitutions and alterations herein without departing from the spirit and scope of the invention in its broadest form.

What is claimed is:

1. A transition-isolating drive circuit for a synchronous rectifier, comprising:
    drive switches coupled to a transformer winding and configured to provide drive signals for said synchronous rectifier; and
    a conduction-inhibiting circuit, coupled to said drive switches, that increases a turn-off voltage of said drive signals to a predetermined level that substantially prevents the drive switches from simultaneously conducting.

2. The circuit as recited in claim 1 wherein said conduction-inhibiting circuit comprises a component that produces a reference voltage on which said predetermined level is based.

3. The circuit as recited in claim 2 wherein said component is a zener diode.

4. The circuit as recited in claim 3 wherein said conduction-inhibiting circuit further comprises a blocking diode series-coupled to said component.

5. The circuit as recited in claim 1 wherein said conduction-inhibiting circuit comprises a zener diode associated with each of said drive switches.

6. The circuit as recited in claim 1 further comprising a conduction-enhancing circuit, coupled to said drive switches, that limits a turn-on voltage of said drive signals to a predetermined level.

7. The circuit as recited in claim 1 wherein said transformer winding is a secondary winding and said circuit further comprises isolation capacitors interposing said secondary winding and said drive switches.

8. A method of providing drive signals to a synchronous rectifier, comprising:
    employing an input voltage from a transformer winding to provide said drive signals to said synchronous rectifier; and
    increasing a turn-off voltage of said drive signals to a predetermined level that substantially prevents the drive switches from simultaneously conducting.

9. The method as recited in claim 8 wherein said increasing is carried out by a component that produces a reference voltage on which said predetermined level is based.

10. The method as recited in claim 9 wherein said component is a zener diode.

11. The method as recited in claim 9 wherein a blocking diode is series-coupled to said component.

12. The method as recited in claim 8 wherein said increasing is carried out by a zener diode associated with each of said drive switches.

13. The method as recited in claim 8 further comprising limiting a turn-on voltage of said drive signals to a predetermined level.

14. The method as recited in claim 8 wherein said transformer winding is a secondary winding and said method further comprises isolating said secondary winding and said drive switches.

15. A power converter, comprising:
    a main power switch coupled to a DC voltage source;
    a transformer coupled to said main power switch;

a synchronous rectifier coupled to said transformer that provides a converter output; and a transition-isolating drive circuit for said synchronous rectifier, including:

drive switches coupled to a winding of said transformer and configured to provide drive signals for said synchronous rectifier, and a conduction-inhibiting circuit, coupled to said drive switches, that increases a turn-off voltage of said drive signals to a predetermined level that substantially prevents the drive switches from simultaneously conducting.

16. The power converter as recited in claim 15 wherein said conduction-inhibiting circuit comprises a component that produces a reference voltage on which said predetermined level is based.

17. The power converter as recited in claim 16 wherein said component is a zener diode.

18. The power converter as recited in claim 16 wherein said conduction-inhibiting circuit further comprises a blocking diode series-coupled to said component.

19. The power converter as recited in claim 15 wherein said conduction-inhibiting circuit comprises a zener diode associated with each of said drive switches.

20. The power converter as recited in claim 15 further comprising a conduction-enhancing circuit, coupled to said drive switches, that limits a turn-on voltage of said drive signals to a predetermined level.

21. The power converter as recited in claim 15 wherein said winding is a secondary winding and said circuit further comprises isolation capacitors interposing said secondary winding and said drive switches.

* * * * *